United States Patent

Kuwamoto et al.

[11] Patent Number: 5,853,459
[45] Date of Patent: Dec. 29, 1998

[54] EXHAUST AS PURIFYING METHOD, EXHAUST GAS FILTER, AND EXHAUST GAS FILTER PURIFYING APPARATUS USING SAME

[75] Inventors: Yoshinobu Kuwamoto, Onojo; Kensei Fukuda, Saga-ken; Yasuhiro Fujiwara, Kasuga, all of Japan

[73] Assignee: Matsushita Electric Industrial Co., Ltd., Osaka, Japan

[21] Appl. No.: 889,734

[22] Filed: Jul. 8, 1997

[30] Foreign Application Priority Data

Jul. 18, 1996 [JP] Japan .................................. 8-189139

[51] Int. Cl.⁶ ............................ C04B 38/00; B01D 46/00
[52] U.S. Cl. .............................. 95/273; 55/283; 55/523; 55/DIG. 30; 60/311; 95/18; 95/278
[58] Field of Search .................... 55/523, 283, DIG. 30; 95/273, 14, 18, 278, 283; 60/311

[56] References Cited

U.S. PATENT DOCUMENTS

| | | | |
|---|---|---|---|
| 4,281,512 | 8/1981 | Mills | 55/523 |
| 4,340,403 | 7/1982 | Higuchi et al. | 55/523 |
| 4,415,344 | 11/1983 | Frost et al. | 55/523 |
| 4,417,908 | 11/1983 | Pitcher, Jr. | 55/523 |
| 4,419,108 | 12/1983 | Frost et al. | 55/523 |
| 4,420,316 | 12/1983 | Frost et al. | 55/523 |
| 4,428,758 | 1/1984 | Montierth | 55/523 |
| 4,535,589 | 8/1985 | Yoshida et al. | 55/DIG. 30 |
| 4,559,193 | 12/1985 | Ogawa et al. | 55/523 |
| 4,810,554 | 3/1989 | Hattori et al. | 55/523 |
| 5,085,049 | 2/1992 | Rim et al. | 55/DIG. 30 |
| 5,114,581 | 5/1992 | Goldsmith et al. | 55/523 |
| 5,498,288 | 3/1996 | Noky | 55/523 |
| 5,701,735 | 12/1997 | Kawaguchi | 55/DIG. 30 |

*Primary Examiner*—Duane S. Smith
*Attorney, Agent, or Firm*—Stevens, Davis, Miller & Mosher, L.L.P.

[57] ABSTRACT

An exhaust gas purifying method, an exhaust gas filter and an exhaust gas filter purifying apparatus reduce the quantity of collected particulates on the outer periphery of the exhaust gas filter and prevent insufficient combustion of particulates during regeneration. The exhaust gas purifying method purifies an exhaust gas by using an exhaust gas filter including a throughhole diaphragm formed into a honeycomb shape in an outer peripheral wall integrally with this outer peripheral wall. A sealing portion is formed on an end portion of a plurality of throughholes partitioned by the throughhole diaphragm, so that the quantity of particulates collected in the throughholes adjacent to the outer peripheral wall and the throughhole diaphragm is reduced as compared with the other portions. The exhaust gas filter has a second sealing portion formed in the throughholes adjacent to the outer peripheral wall and the sealing portion on one end surface of the exhaust gas filter.

15 Claims, 6 Drawing Sheets

END SURFACE ON EXHAUST GAS INLET SIDE

EXHAUST AS PURIFYING METHOD, EXHAUST GAS FILTER, AND EXHAUST GAS FILTER PURIFYING APPARATUS USING SAME

BACKGROUND OF THE INVENTION

1. Field of the Invention

The present invention relates to an exhaust gas purifying method for collecting combustible particulates (hereinafter simply referred to as "particulates") such as soot discharged from a diesel engine or the like, an exhaust gas filter, and an exhaust gas filter purifying apparatus for burning collected particulates and removing the same from the exhaust gas filter.

2. Description of the Related Art

Regulation on particulates discharged from diesel engines has recently been started because of the adverse effect thereof on environmental protection and human health. As a filter for collecting such particulates and purifying exhaust gas, it is the common practice to use an exhaust gas filter comprising a heat-resistant honey-comb structure and an exhaust gas filter purifying apparatus having an exhaust gas filter.

Now, an exhaust gas purifying method, an exhaust gas filter and an exhaust gas filter purifying apparatus according to the conventional art will be described below.

FIG. 7 is a sectional view of a conventional exhaust gas filter, and FIG. 8 is a plan view of an important portion of the conventional exhaust gas filter.

In FIGS. 7 and 8, the numeral 1 denotes an outer peripheral wall, the numeral 2 a throughhole diaphragm, the numeral 3 the throughhole, and the numeral 4 a sealing portion.

As shown in FIG. 7, the conventional exhaust gas filter provides with an outer peripheral wall 1, a throughhole diaphragm 2 formed integrally with the outer peripheral wall 1 into a honey-comb shape within the outer peripheral wall 1, a plurality of throughholes 3 partitioned by the throughhole diaphragm 2, and a sealing portion 4 formed only on an end of the throughholes 3. The sealing portion 4 is formed into a checkered pattern on the both end surfaces of the exhaust gas filter.

In the exhaust gas filter having the construction as described above, the exhaust gas flowing in through an open throughhole 3 on one end surface of the exhaust gas filter as shown by an arrow in FIG. 7 flows in and out through the other throughholes 3 via fine holes (not shown) formed in the throughhole diaphragm 2. After particulates in the exhaust gas are collected in the throughhole diaphragm 2, a purified exhaust gas flows out from through open throughholes 3 on the other end surface of the exhaust gas filter.

Because the exhaust gas discharged from a diesel engine or the like has a temperature lower than the firing temperature upon combustion of the particulates, collected particulates are slowly accumulated in the exhaust gas filter. The thus accumulated particulates clog up the exhaust gas filter, and cause an excessive rise of the exhaust gas flowing into the exhaust gas filter, thereby reducing functions of the diesel engine or the like. At the moment when particulates in a prescribed quantity have been collected in the exhaust gas filter, therefore, it is necessary to forcedly fire the particulates to convert the same into carbon dioxide gas, and to release the same from the exhaust gas filter. Such combustion and release of the particulates is called regeneration of the exhaust gas filter, and can be accomplished by increasing the exhaust gas temperature or temperature of the exhaust gas filter.

Now, the conventional exhaust gas filter purifying apparatus for conducting regeneration of such an exhaust gas filter will be described below.

FIG. 9 is a partial schematic view of the conventional exhaust gas filter purifying apparatus.

In FIG. 9, the numeral 6 denotes a diesel engine; the numeral 7 a manifold; the numeral 8 a common exhaust pipe; the numeral 9 an exhaust gas introducing valve; the numerals 10a and 10b first branch pipes; the numerals 11a and 11b air discharge valves; the numerals 12a and 12b air exhaust pipes; the numerals 13a and 13b exhaust gas inlet pipes; the numerals 14a and 14b containers; the numerals 18a and 18b exhaust gas discharge pipes; the numerals 20a and 20b second branch pipes; the numeral 21 an air switching valve; the numeral 22 blowing means; the numeral 23 a blowing means connecting pipe; the numeral 29 an equipment controller; the numerals 30a and 30b exhaust gas filter; and the numerals 31a and 31b heating means.

In the conventional exhaust gas filter purifying apparatus, as shown in FIG. 9, the first branch pipes 10a and 10b are connected via an exhaust gas introducing valve 9 to the common exhaust pipe 8 connected to the manifold 7 in the diesel engine 6. Each of the first branch pipes 10a and 10b is connected via the exhaust gas inlet pipes 13a and 13b to the container 14a or 14b, and the exhaust gas discharge pipes 18a and 18b are connected to the side opposite to the exhaust gas inlet pipes 13a and 13b of the containers 14a and 14b, respectively. The exhaust gas discharge pipes 18a and 18b are connected, respectively, to the second branch pipes 20a and 20b which are in turn connected via the air switching valve 21 arranged at the connecting portion thereof to the blowing means connecting pipe 23, and the blowing means 22 such as an air blower is arranged at the other end of the blowing means connecting pipe 23. The first branch pipes 10a and 10b branch between the exhaust gas introducing valve 9 and the exhaust gas inlet pipes 13a and 13b, and are connected via the air exhaust valves 11a and 11b to the air discharge pipes 12a and 12b, respectively. In each of the containers 14a and 14b, the exhaust gas filters 30a and 30b, and then the heating means 31a and 31b such as electric heaters are arranged, respectively, in the order from the side of the exhaust gas inlet pipes 13a and 13b. The equipment controller 29 controls opening/closing of the exhaust gas introducing valve 9, the air switching valve 21, and the air exhaust valves 11a and 11b, and operation of the heating means 31a and 31b and the blowing means 22.

The common exhausting pipe 8, the first branch pipes 10a and 10b, the air discharge pipes 12a and 12b, the exhaust gas inlet pipes 13a and 13b, the containers 14a and 14b, the exhaust gas discharge pipes 18a and 18b, the second branch pipes 20a and 20b, and the blowing means connecting pipe 23 are made of a corrosion-resistant stainless steel, and pneumatic, hydraulic or electromagnetic type opening/closing valves are used as the exhaust gas introducing valve 9, the air exhaust valves 11a and 11b, and the air switching valve 21.

Operation of the conventional exhaust gas filter purifying apparatus having the foregoing structure will now be describe below with reference to FIG. 9.

While purifying the exhaust gas from the diesel engine 6 in the exhaust gas filter 30a, the pressure difference of the exhaust gas between before and after the exhaust gas filter 30a is detected by means of a pressure differential sensor (not shown) arranged in the container 14a. When the detected pressure difference becomes over a prescribed value, the particulates in a predetermined quantity is determined to have been collected in the exhaust gas filter 30a in the equipment controller 29, and regeneration of the exhaust gas filter 30a is started.

First, the equipment controller 29 causes operation of the exhaust gas introducing valve 9 so as to ensure communication between the common discharge pipe 8 and the first branch pipe 10b, and switches over the air switching valve 21 so as to achieve communication between the second branch pipe 20 and the blowing means connecting pipe 23. As a result of these operations, inflow of the exhaust gas from the diesel engine to the container 14a is interrupted, and collection of the particulates in the exhaust gas is started by the action of the exhaust gas filter 14b arranged in the container 14b.

Then, the equipment controller 29 causes operation of the heating means 31a to start heating of the exhaust gas filter 30a, and operates the blowing means 22 to supply air from the exhaust gas discharge pipe 18a into the container 14a. After the lapse of a predetermined period of time, combustion of the particulates collected in the exhaust gas filter 30a is started when temperature of the exhaust gas filter 30a reaches the firing temperature of particulates. At this point, carbon dioxide gas and the like produced by the combustion of the particulates are discharged from the air discharge pipe 12a through the air exhaust valve 11a opened by the equipment controller 29.

After the lapse of a predetermined period of time from the start of combustion of the particulates, the equipment controller 29 interrupts operation of the heating means 31a, and combustion of the particulates is continued in the exhaust gas filter 30a by the supply of air only. This combustion is accomplished by flame propagation of the particulates.

After the further lapse of a predetermined period of time when combustion of the particulates is deemed to have been completed, the blowing means 22 stops and the air exhaust valve 11a is closed, thus bringing the exhaust gas filter 30 into a purifying standby state. Subsequently, when the pressure differential sensor or the like arranged in the container 14b determines start of regeneration of the exhaust gas filter 30b under control of the equipment controller 29, regeneration of the exhaust gas filter 30b is performed by the repetition of the foregoing operations.

However, the conventional exhaust gas purifying method, exhaust gas filter and exhaust gas filter purifying apparatus have the following problems.

1) Upon combustion of the particulates in the exhaust gas filter, a temperature of the outer periphery is lower than that at the center portion of the exhaust gas filter. Some particulates are therefore left unburned near the outer periphery during regeneration, thus making it impossible to perfectly regenerate the exhaust gas filter.

2) When there are unburned particulates upon regeneration, the collecting efficiency in the subsequent collection of particulates is reduced, and clogging of the exhaust gas filter prevents smooth passage of the exhaust gas, thus resulting in a larger pressure loss of negative pressure of the diesel engine and hence in an increased fuel consumption and a decrease in engine efficiency.

3) The unburned particulates produced during repetition of a cycle of collection of particulates and regeneration of the exhaust gas filter may cause an abnormal combustion in regeneration, resulting in cracks in the exhaust gas filter and in burnout of the exhaust gas filter.

SUMMARY OF THE INVENTION

The present invention was developed to solve the aforesaid conventional problems, and has an object to provide an exhaust gas purifying method which reduces the quantity of particulates accumulated near the outer peripheral wall of the exhaust gas filter, prevents insufficient combustion of the particulates during regeneration, and permits prevention of clogging of the exhaust gas filter, to provide an exhaust gas filter which reduces the quantity of particulates accumulated near the outer peripheral wall of the exhaust gas filter, prevents insufficient combustion of the particulates during regeneration, permit prevention of clogging of the exhaust gas filter, and allows improvement of regenerating combustion rate of the exhaust gas filter, and to provide an exhaust gas filter purifying apparatus which gives a high regeneration combustion rate of the exhaust gas filter, prevents an abnormal combustion in the exhaust gas filter, and permits prevention of occurrence of cracks or burnout of the exhaust gas filter.

With a view to solving the above-mentioned problems, the present invention provides an exhaust gas purifying method by the use of an exhaust gas filter having an outer peripheral wall, a throughhole diaphragm formed into a honey-comb shape integrally with the outer peripheral wall and within the outer peripheral wall, a plurality of throughholes partitioned by the throughhole diaphragm, and a sealing portion formed only on an end of the throughholes, the sealing portion being formed into a checkered pattern on an end surface on which the sealing portion is formed; comprising the step of reducing the quantity of collected particulates in the throughholes adjacent to the outer peripheral wall of the exhaust gas filter and on the throughhole diaphragm as compared with that of the other portions.

With this constitution, there is provided an exhaust gas purifying method which reduces the quantity of particulates accumulated near the outer peripheral wall of the exhaust gas filter, prevents insufficient combustion of the particulates during regeneration, and permits prevention of clogging of the exhaust gas filter.

The exhaust gas filter according to the invention includes an outer peripheral wall, a throughhole diaphragm formed into a honey-comb shape integrally with the outer peripheral wall and within the outer peripheral wall, a plurality of throughholes partitioned by the throughhole diaphragm, and a sealing portion formed only on an end of the throughholes, the sealing portion being formed into a checkered pattern on an end surface on which the sealing portion is formed; the exhaust gas filter further comprising a second sealing portion formed in the throughhole adjacent to the outer peripheral wall and the sealing portion on any one of the end surfaces of the gas filter.

With this configuration, there is provided san exhaust gas filter which reduces the quantity of particulates accumulated near the outer peripheral wall of the exhaust gas filter, prevents insufficient combustion of the particulates during regeneration, permits prevention of clogging of the exhaust gas filter, and allows improvement of regenerating combustion rate of the exhaust gas filter.

The exhaust gas filter purifying apparatus according to the invention includes: (a) an exhaust gas filter providing with an outer peripheral wall, a throughhole diaphragm formed into a honey-comb shape integrally with the outer peripheral wall and within the outer peripheral wall, a plurality of throughholes partitioned by the throughhole diaphragm, and a sealing portion formed only on an end of the throughholes, the sealing portion being formed into a checkered pattern on an end surface on which the sealing portion is formed; the exhaust gas filter further providing with a second sealing portion formed in the throughhole adjacent to the outer peripheral wall and the sealing portion on any one of the end surfaces of the gas filter; (b) a container housing the exhaust gas filter; (c) an exhaust gas inlet pipe formed on one side of the container; (d) an exhaust gas discharge pipe formed on the other side of the container; (e) temperature detecting means for detecting temperature of the exhaust gas filter; (f) heating means for heating the exhaust gas filter; and (g) a device controller for controlling the heating means in response to temperature of the exhaust gas filter detected by the temperature detecting means.

With this constitution, there is provided an exhaust gas filter purifying apparatus which gives a high regenerating combustion rate of the exhaust gas filter, prevents an abnormal combustion in the exhaust gas filter, and permits prevention of occurrence of cracks or burnout of the exhaust gas filter.

DETAILED DESCRIPTION OF THE PREFERRED EMBODIMENTS

Figure 1:
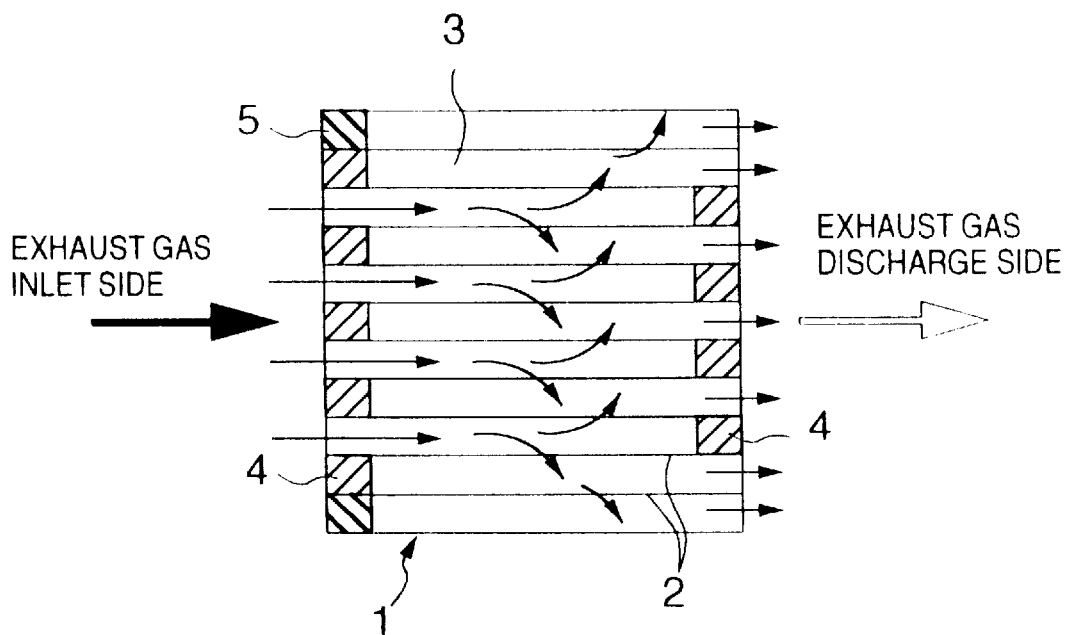
FIG. 1 is a sectional view of an exhaust gas filter in an embodiment of the present invention.

According to the invention an exhaust gas purifying method is provided by the use of an exhaust gas filter having an outer peripheral wall, a throughhole diaphragm formed into a honey-comb shape integrally with the outer peripheral wall and within the outer peripheral wall, a plurality of throughholes partitioned by the throughhole diaphragm, and a sealing portion formed only on an end of the throughholes, the sealing portion being formed into a checkered pattern on an end surface on which the sealing portion is formed; including the step of reducing the quantity of collected particulates in the throughholes adjacent to the outer peripheral wall of the exhaust gas filter and on the throughhole diaphragm as compared with that of the other portions, and this method of the invention reduces the quantity of particulates accumulated near the outer peripheral wall of the exhaust gas filter, prevents insufficient combustion of the particulates during regeneration, and permit prevention of clogging of the exhaust gas filter.

According to the invention, further, there is provided an exhaust gas filter including an outer peripheral wall, a throughhole diaphragm formed into a honey-comb shape integrally with the outer peripheral with the outer peripheral wall and within the outer peripheral wall, a plurality of throughholes partitioned by the throughhole diaphragm, and a sealing portion formed only on an end of the throughholes, the sealing portion being formed into a checkered pattern on an end surface on which the sealing portion is formed; the exhaust gas filter further including a second sealing portion formed in the throughhole adjacent to the outer peripheral wall and the sealing portion on any one of the end surfaces of the gas filter.

Applicable materials for the exhaust gas filter include cordierite, mullite, and aluminum titanate. The shape of the exhaust gas filter may be any of a cylindrical, an oval cylindrical and rectangular shapes. The exhaust gas filter has, for example, a diameter within a range of from 4 to 13 inches, and a length within a range of from 5 to 14 inches, and has from 50 to 400 cells per square inch. The quantity of collected particulates per unit volume of the exhaust gas filter is, for example, within a range of from 1 to 30 g/l.

According to the present invention, further, there is provided an exhaust gas filter purifying apparatus including the foregoing exhaust gas filter, a container housing the exhaust gas filter, an exhaust gas inlet pipe formed on one side of the container, an exhaust gas discharge pipe formed on the other side of the container, temperature detecting means for detecting temperature of the exhaust gas filter, heating means for heating the exhaust gas filter, and an equipment controller for controlling the heating means in response to temperature of the exhaust gas filter detected by the temperature detecting means, which gives a high regeneration combustion rate of the exhaust gas filter, prevents an abnormal combustion in the exhaust gas filter, and permits prevention of occurrence of cracks or burnout of the exhaust gas filter.

As the material for the container, a heat-resistant metal such as stainless steel or a ceramics is used. To avoid occurrence of a temperature difference between the inner and the outer peripheries of the exhaust gas filter caused by heat dissipation of the container, it is desirable to wind a heat-insulating material such as a ceramic wool onto the outer periphery of the container.

Temperature detecting means provided with a thermocouple of the sheath type or of a platinum resistance and a temperature detector is used. Particularly, the thermocouple should be capable of detecting high temperatures of up to about 700° to 800° C. and corrosion-resistant to an exhaust gas from a diesel engine.

As the heating means, an electric heater or a ceramic heater housing a heating element such as a nichrome wire or a kanthal wire in a protection tube made of a ceramics is employed. A heater of a type burning a fuel such as a burner is also applicable.

Because the particulates contain meltable organic substances (SOF) which are evaporated during regeneration without being burned and released to the open air, it is desirable to provide a catalytic filter carrying a catalyst such as a precious metal which decomposes SOF before or after the exhaust gas filter in the container.

The apparatus of the present invention should have blowing means which has a function of preventing occurrence of cracks as a result of a temperature gradient in the exhaust gas filter by heating the entire exhaust gas filter.

An air blower, an air pump or a compressor is used as the blowing means. Air should be supplied into the exhaust gas filter at a flow rate within a range of from about 0.01 to 2 $m^3$/minute.

Now, the present invention will be described by means of some embodiments.

(Embodiment 1)

Figure 2:
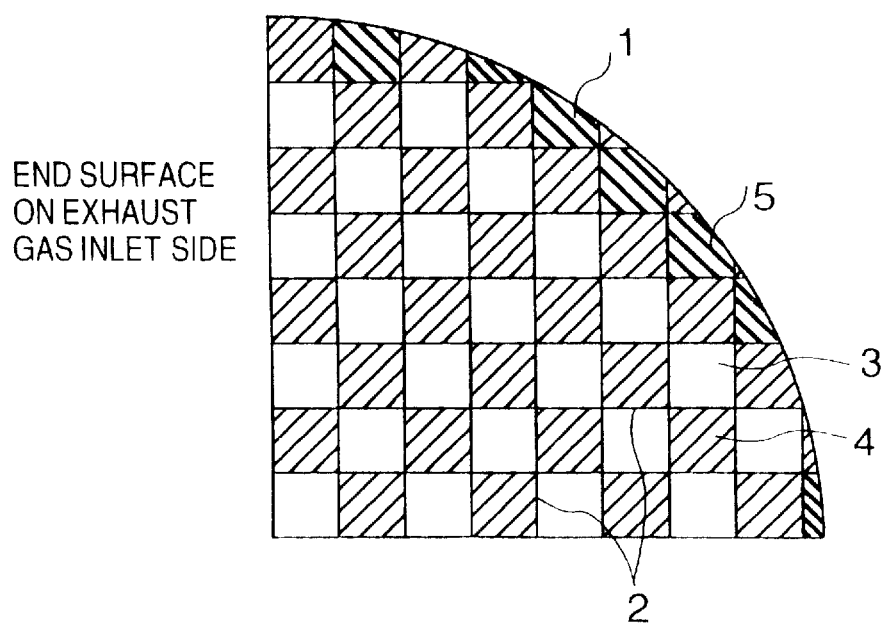
FIG. 2 is a plan view of an important portion of an exhaust gas filter in an embodiment of the invention.

FIG. 1 is a sectional view of an exhaust gas filter in an embodiment of the invention, and FIG. 2 is a plan view of an important portion of the exhaust gas filter in the embodiment of the invention.

In FIGS. 1 and 2, the numeral 5 denotes a second sealing portion. As an outer peripheral wall 1, a throughhole diaphragm 2, a throughhole 3 and a sealing portion 4 are the same as those in the conventional case, these components are assigned the same reference numerals and the description is omitted here.

The exhaust gas filter of this embodiment of the invention differs from the conventional one in that, as shown in FIGS. 1 and 2, any one of the end surfaces of the exhaust gas filter is provided with a second sealing portion 5 formed in the throughhole 3 adjacent to the outer peripheral wall 1 and the sealing portion 4.

By causing the exhaust gas to flow in from the side having the second sealing portion 5 formed thereon of the exhaust gas filter having the construction as described above and collecting particulates contained in the exhaust gas as in the conventional case, it is possible to reduce the quantity of accumulated particulates collected by the throughhole diaphragm 2 near the outer peripheral wall 1 to under that in the other portions of the throughhole diaphragm 2, under the effect of the second sealing portion 5 formed thereon, thus permitting avoidance of insufficient combustion of the particulates near the outer peripheral wall 1 where the combustion temperature is lower during regeneration. It is therefore possible to prevent clogging of a hole (not shown) or the throughhole 3 formed in the throughhole diaphragm 2 caused by the insufficient combustion of the particulates, and to improve the regeneration combustion rate of the exhaust gas filter.

According to this embodiment of the invention, as described above, by providing a second sealing portion formed in the throughhole adjacent to the outer peripheral wall and the sealing portion on one end surface of the exhaust gas filter, it is possible to reduce the quantity of particulates accumulated near the outer peripheral wall of the exhaust gas filter, prevent insufficient combustion of the particulates during regeneration, prevent clogging in the exhaust gas filter, and improve the regeneration combustion rate of the exhaust gas filter.

In the exhaust gas filter in this embodiment of the invention, it is desirable to form a second sealing portion in every throughhole adjacent to the outer peripheral wall and the sealing portion on any of the end surfaces of the exhaust gas filter. When it is very difficult to form a second sealing portion because of the very limited area of the throughhole, however, it suffices to form a second sealing portion on a predetermined portion adjacent to the outer peripheral wall and the sealing portion.

(Embodiment 2)

Figure 3:
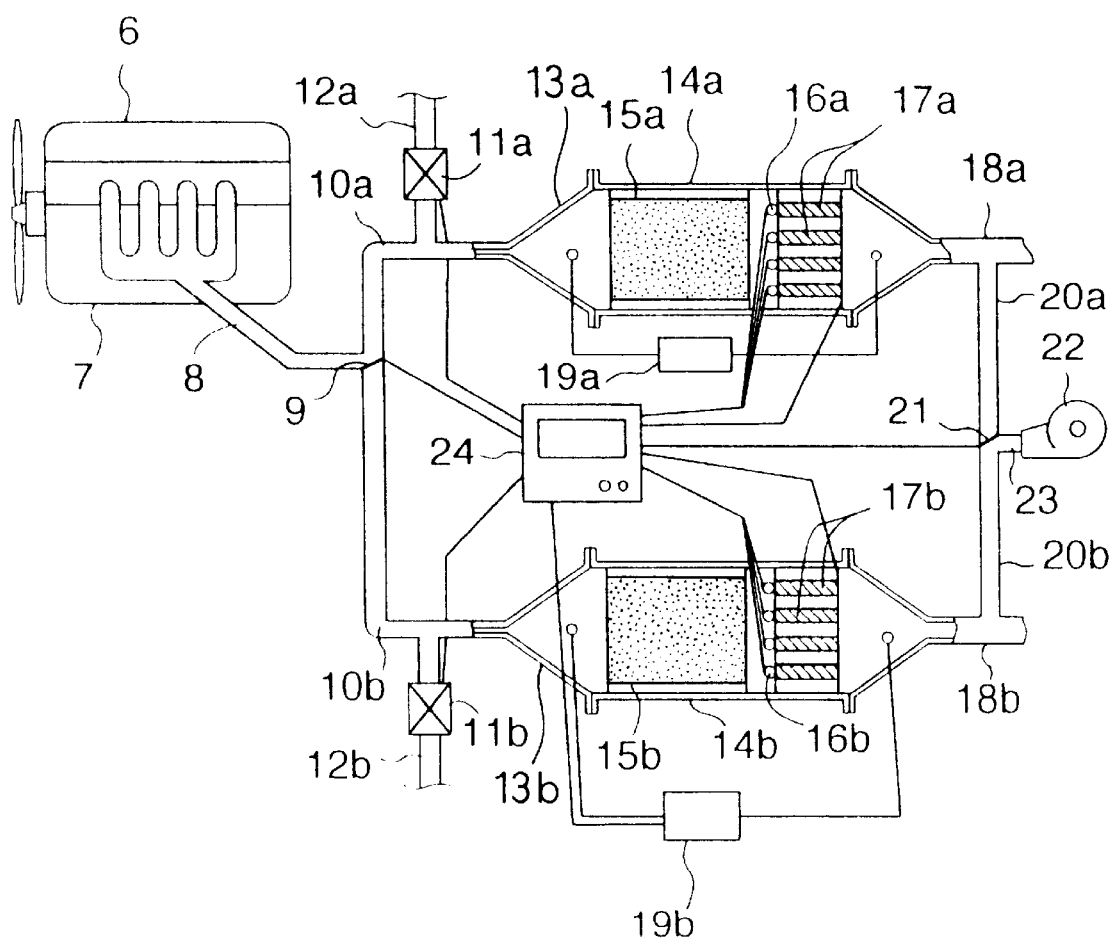
FIG. 3 is a sectional view of an important portion of an exhaust gas filter purifying apparatus in an embodiment of the invention.

FIG. 3 is a sectional view of an important portion of an exhaust gas filter purifying apparatus in another embodiment of the invention.

In FIG. 3, the numerals 15a and 15b denote the exhaust gas filters in the embodiment 1 (hereinafter simply referred to as the "exhaust gas filter"); the numerals 16a and 16b temperature detecting means; the numerals 17a and 17b heating means; the numerals 19a and 19b pressure differential detecting means; and the numeral 24 an equipment controller. Because the diesel engine 6, the manifold 7, the common exhaust pipe 8, the exhaust gas introducing valve 9, the first branch pipes 10a and 10b, the air exhaust valves 11a and 11b, the air discharge pipes 12a and 12b, the exhaust gas inlet pipes 13a and 13b, the containers 14a and 14b, the exhaust gas discharge pipes 18a and 18b, the second branch pipes 20a and 20b, the air switching valve 21, the blowing means 22, and the blowing means connecting pipe 23 are the same as in the conventional case, the same reference numerals are assigned to these components, and description thereof is omitted here.

As shown in FIG. 3, the container 14a is provided with the exhaust gas filter 15a, the temperature detecting means 16a, and the heating means 17a, and the heating means 17a is provided with respect to the exhaust gas filter 15a on the side of the exhaust gas discharge pipe 18a. The temperature detecting means 16a and the heating means 17a are connected, together with the pressure differential detecting means 19a, to the device controller 24.

Similarly, the container 14b is provided with the exhaust gas filter 15b, the temperature detecting means 16b and the heating means 17b, and the heating means 17b is provided with respect to the exhaust gas filter 15b on the side of the exhaust gas discharge pipe 18b. The temperature detecting means 16b and the heating means 17b are connected, together with the pressure differential detecting means 19b, to the device controller 24.

The exhaust gas filter purifying apparatus in this embodiment is different from that in the conventional case in that each of the containers 14a and 14b are provided with the exhaust gas filter 15a/15b which has the second sealing portion formed in the throughholes adjacent to the outer peripheral wall and the sealing portion on any of the end surfaces of the exhaust gas filter, the temperature detecting means 16a/16b which detects temperature of the exhaust gas filter 15a/15b and sends an output thereof to the device controller 23, the heating means 17a/17b which heats the exhaust gas filter 15a/15b, and the device controller 24 which controls operations of the heating means 17a/17b in response to the average temperature or the temperature increasing rate of the exhaust gas filter 15a/15b detected by the temperature detecting means 16a/16b.

For the exhaust gas filter purifying apparatus in this embodiment having the construction as described above, operations upon regeneration in a case of regenerating the exhaust gas filter 15a will now be described below with reference to FIG. 3.

In the exhaust gas filter purifying apparatus in this embodiment, the pressure differential detecting means 19a using a pressure sensor or the like constantly detects pressure of the exhaust gas at various portions of the exhaust gas inlet pipe 13a and the exhaust gas discharge pipe 18a of the container 14a, and provides an output thereof to the device controller 24. The device controller 24 calculates differences of these pressure values, and determines whether or not to start regeneration of the exhaust gas filter 15a by means of the thus calculated pressure difference (Step 1).

Since the pressure difference of the exhaust gas at the exhaust gas inlet pipe 13a and the exhaust gas discharge pipe 18a becomes larger according as the quantity of accumulated particulates in the exhaust gas filter 15a becomes larger, the device controller 24 determines that a target quantity of particulates has been collected in the exhaust gas filter 15a, and starts regeneration.

Then in Step 2, the device controller 24 operates the exhaust gas introducing valve 9 so as to achieve communication of the common exhaust pipe 8 with the first branch pipe 10b, so that the exhaust gas from the manifold 7 flows through the common exhaust pipe 8 and the first branch pipe 10b only onto the side of the exhaust gas inlet pipe 13b. Along with this, the device controller 24 operates the air switching valve 21 to achieve communication of the second branch pipe 20 with the blowing means connecting pipe 23. Flow of the exhaust gas to the container 14a is interrupted by these operations.

Then in Step 3, the device controller 24 operates the heating means 17a comprising an electric heater or the like. At the same time, the device controller 24 drives the blowing means 22 comprising an air blower or the like to start blowing of air, and simultaneously, releases the air exhaust valve 11a to communicate the first branch pipe 10a with the air discharge pipe 12a. As a result of these operations, air flowing from the second branch pipe 20a through the exhaust gas discharge pipe 18a into the container 14a is heated by the heating means into high-temperature blast, and this hot blast heats the exhaust gas filter 15a to cause combustion of the particulates collected by the exhaust gas filter 15a. The hot blast having passed through the exhaust gas filter 15a and carbon dioxide gas generated from combustion of the particulates are discharged from the air discharge pipe 12a through the exhaust gas inlet pipe 13a, the first branch pipe 10a and the air exhaust valve 11a.

Then in Step 4, the device controller 24 determines whether or not the average temperature in the exhaust gas filter 15a provided by the temperature detecting means 16a as an output has reached a target temperature. When the target temperature has not as yet been reached, the device controller 24 performs control, in Step 5, so as to bring the heating means 17a to a higher temperature and so that the exhaust gas filter 15a is heated at a prescribed heating rate. The term heating rate means the amount of change in the average temperature of the exhaust gas filter per unit period of time.

When the target temperature has been reached in Step 4, the equipment controller 24 interrupts heating by the heating means 17a and supply of air by the blowing means 22.

The exhaust gas filter 15b can also be regenerated through operations similar to the above.

According to this embodiment, in which an exhaust gas filter having a second sealing portion formed in the through-hole adjacent to the outer peripheral wall and the sealing portion on one end surface of the exhaust gas filter is used, it is possible to reduce the quantity of particulates accumulated near the outer peripheral wall of the exhaust gas filter, prevent insufficient combustion of the particulates during regeneration, prevent clogging of the exhaust gas filter, and improve regeneration rate of the exhaust gas filter. An abnormal combustion of the exhaust gas filter can be prevented by carrying out regeneration of the exhaust gas filter while controlling the average temperature and the temperature increasing rate of the exhaust gas filter by the equipment controller.

In this embodiment, temperature of the exhaust gas filter is adjusted by controlling the amount of heating by the heating means, but this may also be accomplished by controlling the blast volume sent by the blowing means to the exhaust gas filter. Temperature of the exhaust gas filter may also be adjusted by controlling both the heating means and the blowing means.

In this embodiment, furthermore, an exhaust gas filter purifying apparatus having two exhaust gas filters has also been described. The number of exhaust gas filters may be one or three or more, and in any case, regeneration of the exhaust gas filter can be accomplished in the same manner as in this embodiment.

(Embodiment 3)

Figure 4:
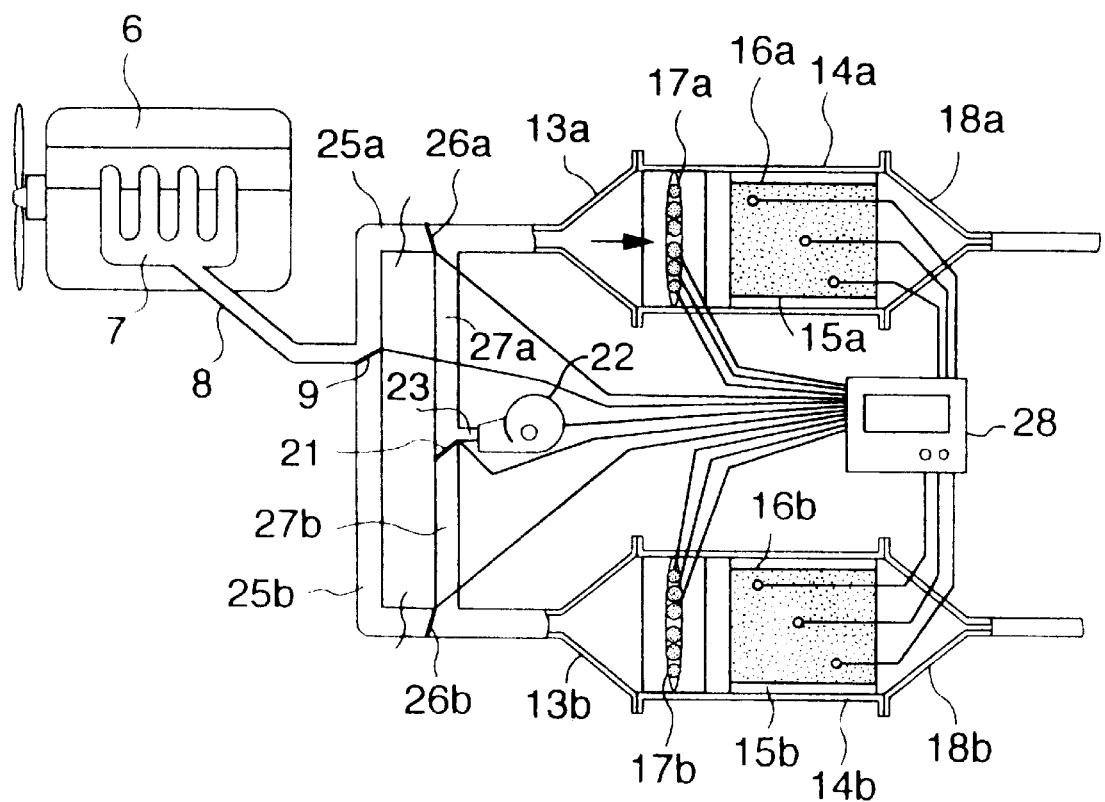
FIG. 4 is a sectional view of an important portion of an exhaust gas filter purifying apparatus in another embodiment of the invention.

FIG. 4 is a sectional view of an important portion of an exhaust gas filter purifying apparatus in another embodiment of the invention.

In FIG. 4, the numerals 25a and 25b denote first branch pipes; the numerals 26a and 26b exhaust gas introducing valves; the numerals 27a and 27b second branch pipes; the numeral 28 an device controller. The diesel engine 6, the manifold 7, the common exhaust pipe 8, the exhaust gas introducing valve 9, the exhaust gas inlet pipes 13a and 13b, the containers 14a and 14b, the exhaust gas filters in the embodiment 1 (hereinafter simply referred to as the "exhaust gas filter") 15a and 15b, the temperature detecting means 16a and 16b, the heating means 17a and 17b, the exhaust gas discharge pipes 18a and 18b, the air switching valve 21, the blowing means 22, and the blowing means connecting pipe 23 are the same as those in the embodiment 2. The same reference numerals are therefore assigned to these components, and the description thereof is omitted here.

As shown in FIG. 4, the first branch pipes 25a and 25b are connected through the exhaust gas introducing valve 9 to the common exhaust pipe 8. The first branch pipe 25a is branch-connected to the exhaust gas inlet pipe 13a and the second branch pipe 27a, and the first branch pipe 25b, to the exhaust gas inlet pipe 13b and the second branch pipe 27b, respectively. The exhaust gas introducing valves 26a and 27b are arranged before these branch points, respectively. The second branch pipes 27a and 27b are connected through the air switching valve 21 to the blowing means connecting pipe 23, and the blowing means connecting pipe 23 is connected to the blowing means 22.

The heating means 17a and the exhaust gas filter 15a are arranged in this order from the exhaust gas inlet pipe 13a in the container 14a, and temperature detecting means 16a such as a thermocouple is provided in the exhaust gas filter 15a. Similarly, the heating means 17b and the exhaust gas filter 15b are arranged in this order from the exhaust gas inlet pipe 13b in the container 14b, and the temperature detecting means 16b such as a thermocouple is provided in the exhaust gas filter 15b.

Further, the exhaust gas introducing valve 9, the exhaust gas introducing valves 26a and 26b, the air switching valve 21, the heating means 17a and 17b, and the temperature detecting means 16a and 16b are connected to the device controller 28 for controlling these components.

The exhaust gas filter purifying apparatus of this embodiment differs from that of the embodiment 2 in that air is supplied to the exhaust gas filters 15a and 15b from the side of the exhaust gas inlet pipes 13a and 13b, and heated by the heating means 17a and 17b, and the particulates in the exhaust gas filters 15a and 15b are burned by flame propagation.

Operation of the exhaust gas filter purifying apparatus having the foregoing construction during regeneration will now be described below for a case where the exhaust gas filter 15a is regenerated.

In the exhaust gas filter purifying apparatus in this embodiment, pressure of the exhaust gas in the exhaust gas inlet pipe 13a and the exhaust gas discharge pipe 18a is always detected by means of a pressure differential detecting means (not shown) using a pressure sensor or the like, and the result is provided as an output to the device controller 28. The device controller 28 calculates the difference in pressure, and determines whether or not to start regeneration of the exhaust gas filter 15a from this difference in pressure (Step 1).

Since the pressure difference of the exhaust gas at the exhaust gas inlet pipe 13a and the exhaust gas discharge pipe 18a becomes larger according as the quantity of accumulated particulates in the exhaust gas filter 15a becomes larger, the device controller 28 determines that a target quantity of particulates has been collected in the exhaust gas filter 15a, and starts regeneration.

Then in Step 2, the device controller 28 operates the exhaust gas introducing valve 9 so as to achieve communication of the common exhaust pipe 8 with the first branch pipe 25b, so that the exhaust gas from the manifold 7 flows through the common exhaust pipe 8 and the first branch pipe 25b only onto the side of the exhaust gas inlet pipe 13b. The exhaust gas introducing valve 26a is switched over by means of the device controller 28 so that the second branch pipe 27a communicates with the exhaust gas inlet pipe 13a, and the exhaust gas introducing valve 26b is switched over by means of the device controller 28 so that the first branch pipe 25b communicates with the exhaust gas inlet pipe 13b. Along with this, the device controller 28 operates the air switching valve 21 to achieve communication of the second branch pipe 27a with the blowing means connecting pipe 23. Flow of the exhaust gas to the container 14a is interrupted by these operations.

Then in Step 3, the device controller 28 operates the heating means 17a comprising an electric heater or the like which is arranged near the outer periphery of the exhaust gas filter 15a. At the same time, the device controller 28 drives the blower means 22 comprising an air blower or the like to start blowing of air. As a result of these operations, air flowing from the second branch pipe 27a through the exhaust gas inlet pipe 13a into the container 14a is heated by the heating means 17a into high-temperature blast, and this hot blast heats the exhaust gas filter 15a to cause ignition and combustion of the particulates collected by the exhaust gas filter 15a. The hot blast having passed through the exhaust gas filter 15a and carbon dioxide gas generated from combustion of the particulates are discharged to outside through the exhaust gas discharge pipe 18a.

Then in Step 4, the device controller 28 determines whether or not the outer periphery temperature of the end surface on the side of the exhaust gas filter 15a facing the exhaust gas inlet port 13a is over a predetermined temperature (for example, 200° C.). When the aforesaid temperature is lower than the predetermined temperature, the amount of heating in the heating means 17a arranged near the outer periphery of the exhaust gas filter 15a, in Step 5, is increased.

When the outer peripheral temperature of the end surface on the side of the exhaust gas inlet port 13a is over a predetermined level in Step 4, heating is started in Step 6 by the portion of the heating means 17a arranged near the center portion of the exhaust gas filter 15a which has not been operated in Step 3.

Then in Step 7, the temperature detecting means determines whether or not the temperature increasing rate on the end surface on the exhaust gas inlet port 13a side of the exhaust gas filter 15a is over a predetermined value (for example, 15° C./second). When the temperature increasing rate is under the predetermined value, the amount by heating of the portion arranged near the center portion of the exhaust gas filter 15a in the heating means 17a operated in step 6 by the device controller 28 is increased in Step 8.

When the temperature increasing rate is over the predetermined value in Step 7, heating by the heating means 17a is totally interrupted in Step 9.

Then in Step 10, the flow rate in the blowing means 22 is controlled by the device controller 28 in response to the maximum temperature or the temperature gradient in the exhaust gas filter 15a.

Then in Step 11, when temperature on the exhaust gas discharge port 18a side in the exhaust gas filter 15a is under a predetermined value (for example, 400° C.), and the temperature increasing rate at this portion is negative, regeneration is discontinued. In any other case, the process returns to Step 10 to adjust the air flow rate.

According to this embodiment, as described above, by using the exhaust gas filter having the second sealing portion formed in the throughhole adjacent to the outer peripheral wall and the sealing portion on any of the end surfaces of the exhaust gas filter, it is possible to reduce the quantity of particulates accumulated near the outer peripheral wall of the exhaust gas filter, prevent insufficient combustion of the particulates during regeneration, prevent clogging in the exhaust gas filter, and improve regeneration rate of the exhaust gas filter. By conducting regeneration of the exhaust gas filter while controlling the average temperature and the temperature increasing rate of the exhaust gas filter by means of the device controller, it is possible to prevent occurrence of an abnormal combustion of the exhaust gas filter.

In this embodiment, furthermore, the exhaust gas filter purifying apparatus provided with the two exhaust gas filters has been described. One or three or more exhaust gas filters may however be arranged, and in this case also, the exhaust gas filter can be regenerated in the same manner as in this embodiment.

EXAMPLES (Example 1, Comparative Example 1)

An exhaust gas filter which was a cylinder having a diameter of 5.66 inches and a length of 6 inches, had 100 cells per square inch and was provided with sealing portions formed in a checkered pattern on the both end surfaces of the exhaust gas filter and a second sealing portion formed in a throughhole adjacent to an outer peripheral wall and the sealing portion as in the embodiment 1 (Example 1) and an exhaust gas filter not having a second sealing portion as in the conventional case (Comparative Example 1) were prepared by the use of cordierite by the known method.

Exhaust gas filter purifying apparatuses identical with the embodiment 2 were prepared by using these exhaust gas filters. In each of these exhaust gas filter purifying apparatuses, an electric heater using a kanthal wire heater was used as the heating means, and an air blower, as the blowing means.

For the purpose of comparing the regeneration rate of the exhaust gas filter purifying apparatuses between the Example 1 and the Comparative Example 1, the exhaust gas filter of each of these exhaust gas filter purifying apparatuses was caused to collect particulates in a quantity of 10 g/l or 20 g/l per unit volume of the exhaust gas filter, and the exhaust gas filter was regenerated in the same manner as in the embodiment 2. A target temperature of 700° C. was used in the exhaust gas filter during regeneration, and the flow rate of air supplied by the air blower to the exhaust gas filter was 500 l/minute.

For the exhaust gas filter purifying apparatus of the Example 1, the relationship between the temperature increasing rate up to the target temperature and the degree of contamination of the exhaust gas filter after regeneration was studied, and the cycle of collection of particulates and regeneration was repeated to measure the degree of contamination of the exhaust gas filter upon completion of regeneration.

The temperature increasing rate is determined by converting temperature data of the exhaust gas filter taken every five seconds into an average temperature increasing rate per minute. The regeneration combustion rate (%) is a value derived from 100 (weight before regeneration−weight after regeneration)/collected quantity, where the weight before regeneration is the total weight of the exhaust gas filter before start of regeneration; the weight after regeneration is the total weight of the exhaust gas filter after the completion of regeneration; and the collected quantity is the difference between the weight of the exhaust gas filter alone not as yet collecting particulates and the weight before regeneration.

The degree of contamination means the concentration of exhaust gas having passed through the exhaust gas filter, as measured with a reflection-type smoke meter, specified in JIS D 8004 (Reflection-Type Smoke Meter for Measuring Concentration of Exhaust Smoke of Automotive Diesel Engine) upon completion of regeneration.

Table 1 shows observed values of regeneration combustion rate for the exhaust gas filter purifying apparatuses in the Example 1 and the Comparative Example 1.

TABLE 1

|  |  | Regeneration combustion rate | |
| --- | --- | --- | --- |
|  |  | Example 1 | Comp. Example 1 |
| Qt. of collect. particulates | 10 g/l 20 g/l | 100% 95% | 92% 83% |

In the case of a quantity of collected particulates of 10 g/l, as shown in Table 1, the Example 1 gave a regeneration combustion rate of 100%, whereas the Comparative Example 1 gave a regeneration combustion rate of 92%. In the case of a quantity of collected particulates of 20 g/l, the Example 1 showed a regeneration combustion rate of 95%, whereas the Comparative Example 1 showed a regeneration combustion rate of 83%. For any of the quantities of collected particulates, the exhaust gas filter purifying apparatus using an exhaust gas filter having the second sealing portion of the Example 1 clearly gave a higher regeneration combustion rate. For the exhaust gas filter used in the exhaust gas filter purifying apparatus of the Comparative Example 1, as observed by dismantling, particulates left unburned were observed in cells adjacent to the outer peripheral wall.

Now, the relationship between the temperature increasing rate of the exhaust gas filter during regeneration and the degree of contamination of the exhaust gas filter after regeneration will be described below with reference to FIG. 5.

Figure 5:
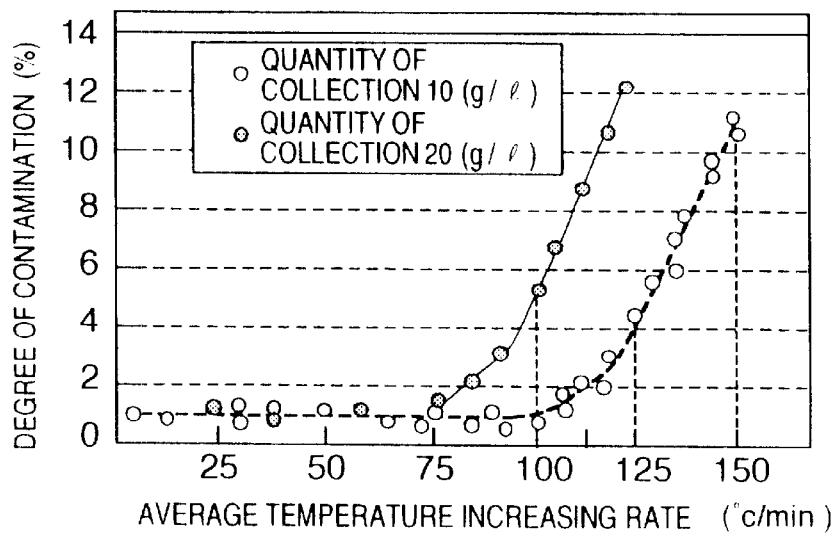
FIG. 5 is a relational diagram between the temperature increasing rate of the exhaust gas filter during regeneration and the degree of contamination of the exhaust gas filter after regeneration.

FIG. 5 is a relational diagram between the temperature increasing rate of the exhaust gas filter upon regeneration and the degree of contamination of the exhaust gas filter after regeneration. As is clear from FIG. 5, in the case of a quantity of collected particulates of 10 g/l, a temperature increasing rate of up to 100° C./minute led to a very low degree of contamination of about 1%, whereas a temperature increasing rate of over 100° C./minute resulted in a rapid increase in the degree of contamination. In the case of a quantity of collected particulates of 20 g/l, a temperature increasing rate of up to 75° C./minute led to a very low degree of contamination of about 1%, whereas a temperature increasing rate of over 75° C./minute resulted in a sharp increase in the degree of contamination. To judge from these results, in the case of a quantity of collected particulates of up to 20 g/l, it is desirable to use a temperature increasing rate of up to 75° C./minute during regeneration of the exhaust gas filter.

The relationship between the number of runs of regeneration and the degree of contamination of the exhaust gas filter after regeneration will now be described below with reference to FIG. 6.

Figure 6:
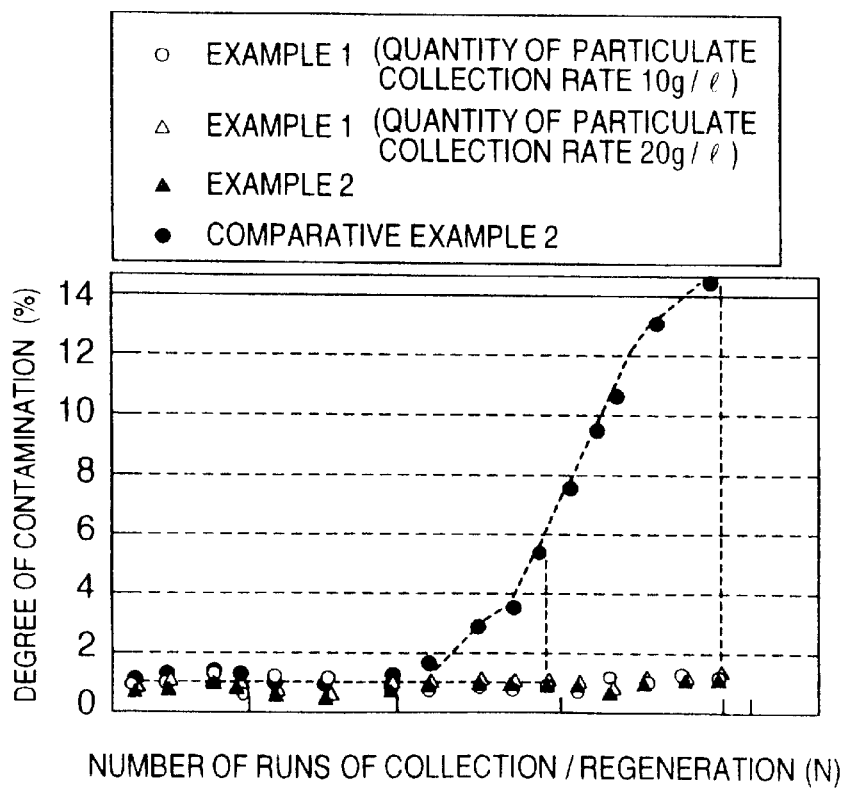
FIG. 6 is a relational diagram between the number of regeneration runs in the exhaust gas filter purifying apparatus and the degree of contamination of the exhaust gas filter after regeneration.
Figure 7:
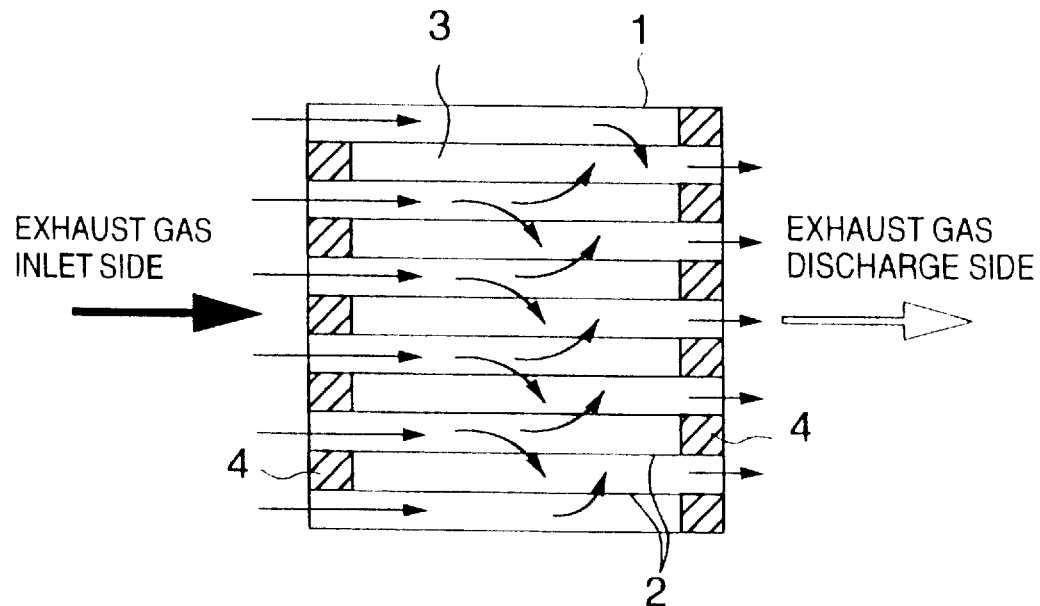
FIG. 7 is a sectional view of a conventional exhaust gas filter.
Figure 8:
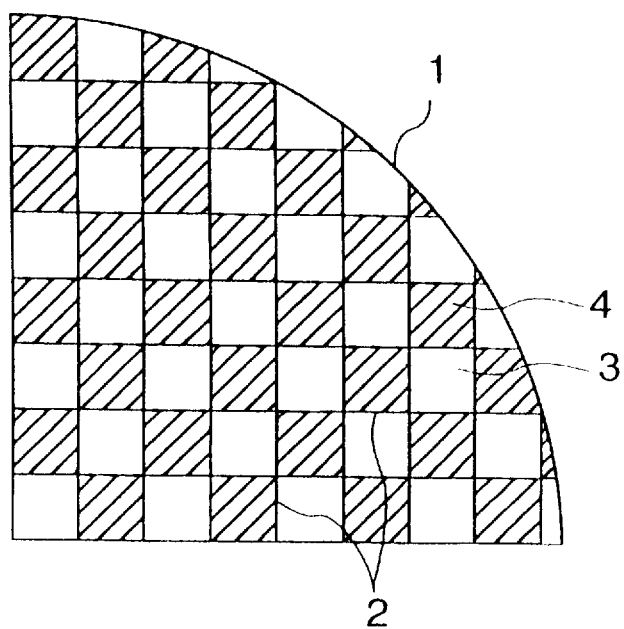
FIG. 8 is a plan view of an important portion of the conventional exhaust gas filter.
Figure 9:
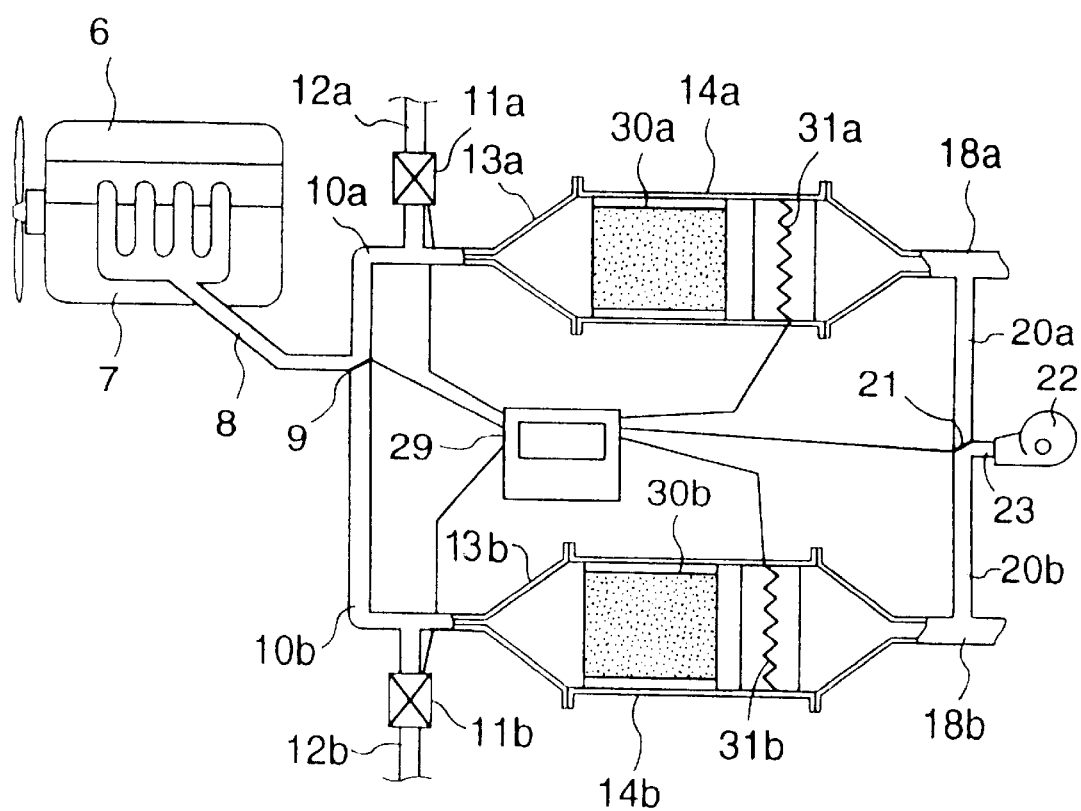
FIG. 9 is a sectional view of an important portion of the conventional exhaust gas filter purifying apparatus.

FIG. 6 is a relational diagram between the number of runs of regeneration and the degree of contamination of the exhaust gas filter in the exhaust gas filter purifying apparatus. As is clear from FIG. 6, in the exhaust gas filter purifying apparatus of the Example 1, in any of quantities of collected particulates of 10 g/l and 20 g/l, the degree of contamination of the exhaust gas filter after regeneration is only about 1 to 2% even after repetition of 1,000 runs of regeneration. This suggests that, even after repetition of a number of regeneration runs, the exhaust gas filter is free from burnout or breakage, has a high exhaust gas purifying property, and is excellent in durability.

(Example 2, Comparative Example 2)

An exhaust gas filter which was a cylinder having a diameter of 5.66 inches and a length of 6 inches, had 100 cells per square inch and was provided with sealing portions formed in a checkered pattern on the both end surfaces of the exhaust gas filter and a second sealing portion formed in a throughhole adjacent to an outer peripheral wall and the sealing portion as in the embodiment 1 (Example 2) and an exhaust gas filter not having a second sealing portion as in the conventional case (Comparative Example 2) were prepared by the use of cordierite by the known method.

Exhaust gas filter purifying apparatuses identical with the embodiment 3 were prepared by using these exhaust gas filters. In each of these exhaust gas filter purifying apparatuses, an electric heater using a kanthal wire heater was used as the heating means, and an air blower, as the blowing means.

For the purpose of comparing the regeneration rate of the exhaust gas filter purifying apparatuses between the Example 2 and the Comparative Example 2, the exhaust gas filter of each of these exhaust gas filter purifying apparatuses was caused to collect particulates in a quantity of 10 g/l per unit volume of the exhaust gas filter, and the exhaust gas filter was regenerated in the same manner as in the embodiment 3. In this Example, a target temperature of 200° C. was used as in Step 4 described in the embodiment 3, with a temperature increasing rate of 15° C./second as in Step 7, and a target temperature of 400° C. as in Step 11, and an air flow rate of 50 l/minute for air supplied to the exhaust gas filter by the air blower.

In any of the exhaust gas filter purifying apparatuses of the Example 2 and the Comparative Example 2, collection of the particulates and regeneration were repeated to measure the degree of contamination of the exhaust gas filter upon completion of each run of regeneration.

The temperature increasing rate, the regeneration combustion rate (%) and the degree of contamination were defined in the same manner as in the Example 1.

Table 2 shows values of regeneration combustion rate in the exhaust gas filter purifying apparatuses in the Example 2 and the Comparative Example 2.

TABLE 2

|  | Example 2 | Comp. Example 2 |
|---|---|---|
| Regen. combustion rate | 89% | 75% |

As shown in Table 2, while the Comparative Example 2 showed a regeneration combustion rate of 75%, the Example 2 showed a regeneration combustion rate of 89%, clearly demonstrating that the exhaust gas filter purifying apparatus using the exhaust gas filter having the second sealing portion of the Example 2 gives a higher regeneration combustion rate. For the exhaust gas filter used in the exhaust gas filter purifying apparatus of the Comparative Example 2, as observed by dismantling, particulates left unburned were observed in cells adjacent to the outer peripheral wall.

Now, the relationship between the number of runs of regeneration and the degree of contamination of the exhaust gas filter after regeneration will be described below with reference to FIG. 6. As is clear from FIG. 6, while the exhaust gas filter purifying apparatus of the Example 2 showed a degree of contamination of only 1 to 2% of the exhaust gas filter after regeneration even after repetition of 1,000 runs of regeneration, the exhaust gas filter purifying apparatus of the Comparative Example 2, the degree of contamination sharply increased at the point of repetition of 500 runs of regeneration. This suggests that the exhaust gas filter purifying apparatus of the Example 2 is free from burnout or breakage in the exhaust gas filter even after repetition of a number of runs of regeneration, has a high exhaust gas purifying property, and is excellent in durability.

According to the exhaust gas purifying method and the exhaust gas filter of the invention, as described above, it is possible to reduce the quantity of particulates accumulated near the outer peripheral wall of the exhaust gas filter, prevent insufficient combustion of particulates upon regeneration, prevent clogging of the exhaust gas filter, and improve the regeneration combustion rate of the exhaust gas filter, hence permitting improvement of durability and reliability of the exhaust gas filter. The invention provides another advantage of preventing the deterioration of fuel consumption of a diesel engine caused by clogging of the exhaust gas filter and decrease in the engine efficiency.

According to the exhaust gas filter purifying apparatus of the invention, furthermore, it is possible to achieve a high regeneration combustion rate of the exhaust gas filter, prevent an abnormal combustion in the exhaust gas filter, and prevent occurrence of cracks or burnout of the exhaust gas filter, thus providing an excellent advantage of improving durability and reliability. By the possibility of heating the entire exhaust gas filter, it is possible to prevent occurrence of cracks caused by the temperature gradient in the exhaust gas filter. This provides an excellent advantage of preventing breakage of the exhaust gas filter caused the temperature gradient and improve durability of the exhaust gas filter.

What is claimed is:

1. A method of purifying exhaust gas, the method comprising:
   (a) providing an exhaust gas filter comprising:
      an outer peripheral wall;
      a throughhole diaphragm formed into a honey-comb shape within said outer peripheral wall to partition a plurality of throughholes:
      a sealing portion formed on an end of said throughholes, said sealing portion being formed into a checkered pattern on the end on which said sealing portion is formed; and
      a second sealing portion formed in a subplurality of said throughholes which are adjacent to said outer peripheral wall and said sealing portion; and
   (b) collecting particulates from the exhaust gas in the exhaust gas filter so as to make a quantity of the particulates collected in ones of said plurality of throughholes which are adjacent to said outer peripheral wall of said exhaust gas filter and on said throughhole diaphragm less than a quantity of the particulates collected in other portions of the exhaust gas filter.

2. A method of purifying exhaust gas, the method comprising:
   (a) providing an exhaust gas filter comprising:
      an outer peripheral wall;
      a throughhole diaphragm formed into a honey-comb shape within said outer peripheral wall to partition a plurality of throughholes;
      a sealing portion formed on an end of said throughholes which is on an exhaust gas inlet side of the gas filter, said sealing portion being formed into a checkered pattern on the end on which said sealing portion is formed; and
      a second sealing portion formed in a subplurality of said throughholes which are adjacent to said outer peripheral wall and said sealing portion; and
   (b) collecting particulates from the exhaust gas in the exhaust gas filter so as to make a quantity of the particulates collected in ones of said plurality of throughholes which are adjacent to said outer peripheral wall of said exhaust gas filter and on said throughhole diaphragm less than a quantity of the particulates collected in other portions of the exhaust gas filter.

3. An exhaust gas filter comprising:
   an outer peripheral wall;
   a throughhole diaphragm formed into a honey-comb shape within said outer peripheral wall to partition a plurality of throughholes;
   a sealing portion formed on an end of said throughholes, said sealing portion being formed into a checkered pattern on the end on which said sealing portion is formed; and
   a second sealing portion formed in a subplurality of said throughholes which are adjacent to said outer peripheral wall and said sealing portion.

4. The exhaust gas filter according to claim 3, wherein said sealing portion is provided on an exhaust gas inlet side of said gas filter.

5. An exhaust gas filter purifying apparatus comprising:
   an exhaust gas filter comprising:
      an outer peripheral wall;
      a throughhole diaphragm formed into a honey-comb shape within said outer peripheral wall to partition a plurality of throughholes:
      a sealing portion formed on an end of said throughholes, said sealing portion being formed into a checkered pattern on the end on which said sealing portion is formed; and
      a second sealing portion formed in a subplurality of said throughholes which are adjacent to said outer peripheral wall and said sealing portion;
   a container housing said exhaust gas filter, the container having a first side and a second side;
   an exhaust gas inlet pipe formed on the first side of said container;
   an exhaust gas discharge pipe formed on the second side of said container;

temperature detecting means for detecting a temperature of said exhaust gas filter;

heating means for heating said exhaust gas filter; and a device control section for controlling said heating means in response to the temperature of said exhaust gas filter detected by said temperature detecting means.

6. The exhaust gas filter purifying apparatus according to claim 5, further comprising blowing means for causing a movement of exhaust gas through the container.

7. The exhaust gas filter according to claim 5, wherein ones of the throughholes which are adjacent to the outer peripheral wall are provided with the sealing portion only on the exhaust gas inlet side.

8. The exhaust gas filter according to claim 3, wherein the throughhole diaphragm is formed integrally with the outer peripheral wall.

9. The exhaust gas filter according to claim 3, wherein the sealing portion is formed only on the end of the throughholes.

10. The exhaust gas purifying method according to claim 1, wherein the throughhole diaphragm is formed integrally with the outer peripheral wall.

11. The exhaust gas purifying method according to claim 1, wherein the sealing portion is formed only on the end of the throughholes.

12. The exhaust gas filter purifying apparatus according to claim 5, wherein the throughhole diaphragm is formed integrally with the outer peripheral wall.

13. The exhaust gas filter purifying apparatus according to claim 5, wherein the sealing portion is formed only on the end of the throughholes.

14. The exhaust gas purifying method according to claim 2, wherein the throughhole diaphragm is formed integrally with the outer peripheral wall.

15. The exhaust gas purifying method according to claim 2, wherein the sealing portion is formed only on the end of the throughholes.

* * * * *